United States Patent [19]
Jonson et al.

[11] Patent Number: 5,709,549
[45] Date of Patent: Jan. 20, 1998

[54] INSTRUCTIONAL APPARATUS FOR COMPUTERS

[76] Inventors: Vance Jonson; Susan J. Landise, both of 5 Brook St., Suite 1A, Darien, Conn. 06820

[21] Appl. No.: 530,865

[22] Filed: Sep. 19, 1995

[51] Int. Cl.⁶ .................................................. G09B 19/00
[52] U.S. Cl. ........................ 434/118; 281/33; 281/31; 281/43
[58] Field of Search .............................. 434/118, 227; 281/33, 31, 47, 43

[56] References Cited

U.S. PATENT DOCUMENTS

| | | | |
|---|---|---|---|
| 1,942,547 | 1/1934 | Gordon et al. | 281/47 |
| 3,334,920 | 8/1967 | Orth | 281/33 |
| 4,466,798 | 8/1984 | Conroy | 434/118 |
| 4,588,321 | 5/1986 | Egly | 281/31 X |
| 4,848,948 | 7/1989 | Pitts | 281/33 X |
| 5,489,120 | 2/1996 | Thornsburg | 281/33 |

FOREIGN PATENT DOCUMENTS 2113887  8/1983  United Kingdom ................. 434/227

*Primary Examiner*—Jeffrey A. Smith
*Attorney, Agent, or Firm*—Standley & Gilcrest

[57] ABSTRACT

The present invention includes a binder adapted to be configured to stand at an angle on a surface. In most basic terms the binder comprises: (a) a spine member adapted to be attached to pages; and (b) a binder cover having front and rear portions, and moveable between a closed position to an open position, the binder attached to the spine member, and the front and rear portions each having a flex line so as to define respective upper and lower portions of the front and rear portions and so as to allow the lower portions of the front and rear portions to be moveable between a position relatively near the spine member to a position relatively further from the spine member, so as to allow the binder to be configured to stand at an angle on the surface.

17 Claims, 7 Drawing Sheets

0
INSTRUCTIONAL APPARATUS FOR COMPUTERS

TECHNICAL FIELD

The present invention pertains to instructional materials for training and education with computers.

BACKGROUND

Computers have become ubiquitous in our society.

Unfortunately, even though computers presently find application in nearly every business, many workers are wholly unfamiliar with the operation of computers in general, and their use in specific applications.

One of the obstacles to be overcome in computer training/education is that neophytes often have difficulty in using written guide materials while simultaneously using the computer. It is often difficult to maintain the written materials in a position that allows them to be comfortably viewed while the computer is in operation and without obstructing the computer screen or interfering with the operation of the computer keyboard. Accordingly, it is desirable to be able to provide written instructional materials that can overcome these problems and inconveniences.

Another problem for computer novices is that it is often difficult to correspond relevant portions of the written materials' text to the screen displays produced by the operating computer. Therefore, it is desirable to produce a computer trig apparatus that provides visual cues between the corresponding portions of the written materials and the screen displays of the computer functions to which they pertain.

Still another inconvenience for new computer users is that the written materials are often quite voluminous and bulky, making handling and transport inconvenient. Thus, it is advantageous to be able to have written instructional materials that permit abbreviated, more focused portions to be used separate from the entire instructional text. It is also advantageous to be able to provide such abbreviated, more focused portions written instructional materials that may be conveniently and securely positioned with respect to the computer for convenient reference during use of the computer.

It is also desirable to provide written instructional materials that can be positioned for easy viewing while being capable of being compactly closed for efficient and easy storage.

In view of the present disclosure or from use of the invention itself, other advantages may become apparent.

SUMMARY OF THE INVENTION

The present invention includes a binder adapted to be configured to stand at an angle on a surface. In most basic terms the binder comprises: (a) a spine member adapted to be attached to pages; and (b) a binder cover having front and rear portions, and moveable between a closed position to an open position, the binder attached to the spine member, and the front and rear portions each having a flex line so as to define respective upper and lower portions of the front and rear portions and so as to allow the lower portions of the front and rear portions to be moveable between a position relatively near the spine member to a position relatively further from the spine member, so as to allow the binder to be configured to stand at an angle on the surface.

The binder cover may be made of any acceptable material, such as metals, plastics, fiber boards, etc., or composites thereof in accordance with known constructions and methods known in the art. The spine may be attached by bolts, screws or like fasteners as is done in the art. The lower portions of the cover may be hinged with respect to the respective upper portions in any fashion, such as by metal or plastic hinges, flexible materials (such as cloths, webbings, plastic sheets), etc. It is preferred that the hinge be supplied by having the cover be formed of a solid, rigid material covered by a flexible material, with the rigid material split at the flex line so as to allow the flexibility of the flexible material to act as a hinge.

The binder may include a retainer member adapted to control the distance the lower portions of the front and rear portions may be moved when moved relatively further from the spine member. This may be, for instance, a strap attached between the spine member an the lower portion of the binder cover.

The binder may be of any type of permanent of loose-leaf construction, such as ring binders, clamp binders, velobinders, stitched or glue binders, but in the preferred embodiment described below it is a loose leaf ring binder construction.

The binder may be of any size, but will preferably be made to accommodate more common paper sizes, such as 8.5 in.×11 in., 8.5 in.×14 in. and A4 paper.

The binder may also include paper of differing sizes, depending upon the intended purpose and paper availability, ranging for instance from over-sized, fold-out leaves to small sizes similar to that of a pocket notebook (i.e. 3 in.×5 in. to 4 in.×6 in.). The pages may be tabbed and/or color coded, and may be angle-cut at the corners for ease of reference to particular portions thereof.

The invention also includes a computer instruction apparatus comprising: (a) a computer having a microprocessor, a monitor screen and a human operation interface; (b) an instructional binder (such as those described above) adapted to be configured to stand at an angle on a surface, as described above.

The binder used in the computer instruction apparatus may also contains pages of at least two types, the page types respectively bearing two types of indicia, and wherein the microprocessor is adapted to create displays on the monitor screen of at least two types, the display types respectively bearing two types of indicia, and respectively corresponding to the pages types. The types of indicia may include at least two colors, and the microprocessor may be adapted to create displays respectively containing at least two colors the same as, similar to or otherwise corresponding to the respective page types, in order to suggest association to the viewer.

The computer instruction apparatus of the present invention may also include a binder containing pages and wherein the apparatus comprises a page hanger adapted to be attached to the monitor screen, and the pages adapted to be attached to the spine member and the page hanger. The page hanger maybe adapted to be removable from the monitor screen and attached in the binder. The binder may contain pages of at least two sizes, including a smaller size and a larger size, and the page hanger adapted to be attached to the monitor screen, the pages of the smaller size adapted to be attached to the spine member and the page hanger. The binder may also contain pages of a larger size (typically larger than the size suitable for the binder) that are creased so as to be folded between a collapsed position and an extended position, to fit in the binder. The binder and the page hanger may have attachment structure adapted to allow pages to be attached to both in similar fashion. For instance, the pages may be hole-punched to fit into a ring binder, with the page hanger having structure adapted to be connected via those same holes.

It is preferred that binder be positioned on a surface between the monitor screen and the human operation interface, and the angle being such that the upper portions of the front and rear portions of the binder are disposed below the monitor screen.

DETAILED DESCRIPTION OF THE PREFERRED EMBODIMENT

In accordance with the foregoing summary, the following presents a preferred embodiment of the present invention, considered to be the best mode of the invention.

Figure 1:
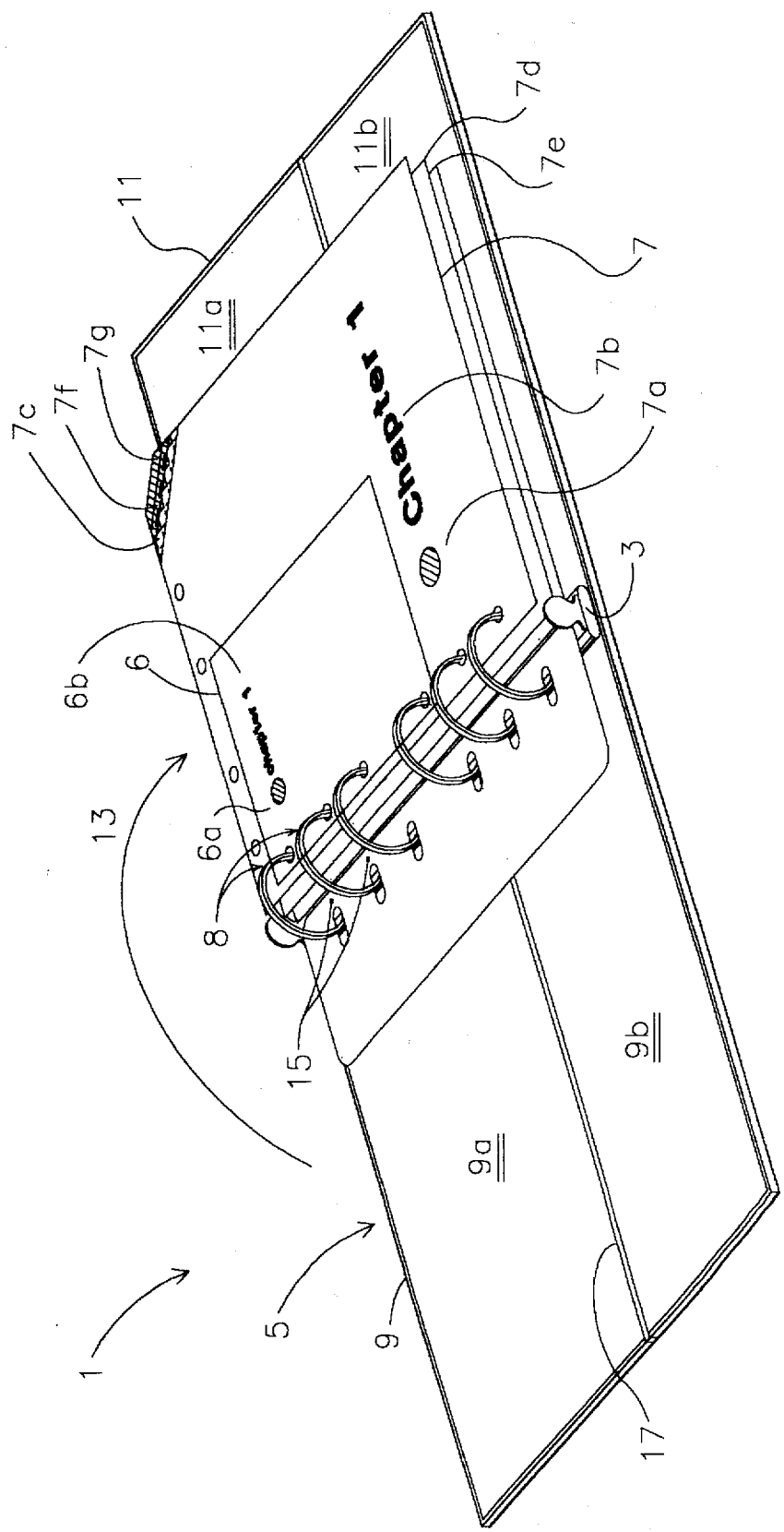
FIG. 1 shows a perspective view of a binder in accordance with one embodiment of the present invention, in the open, flat configuration.

FIG. 1 is a perspective view of a binder 1 in accordance with one embodiment of the present invention, in the open, flat configuration. FIG. 1 shows the spine 3 and cover 5, the spine attached to large pages 7 and small pages 6 via rings 8. The binder cover 5 has front and rear portions 9 and 11, respectively. The cover may be moved between an open position as shown in FIG. 1 to a closed position, such as by moving front portion 9 in the direction 13 as is done to close a book-like binder or notebook. The spine is attached to the upper portion of the binder cover by bolts 15.

Figure 2:
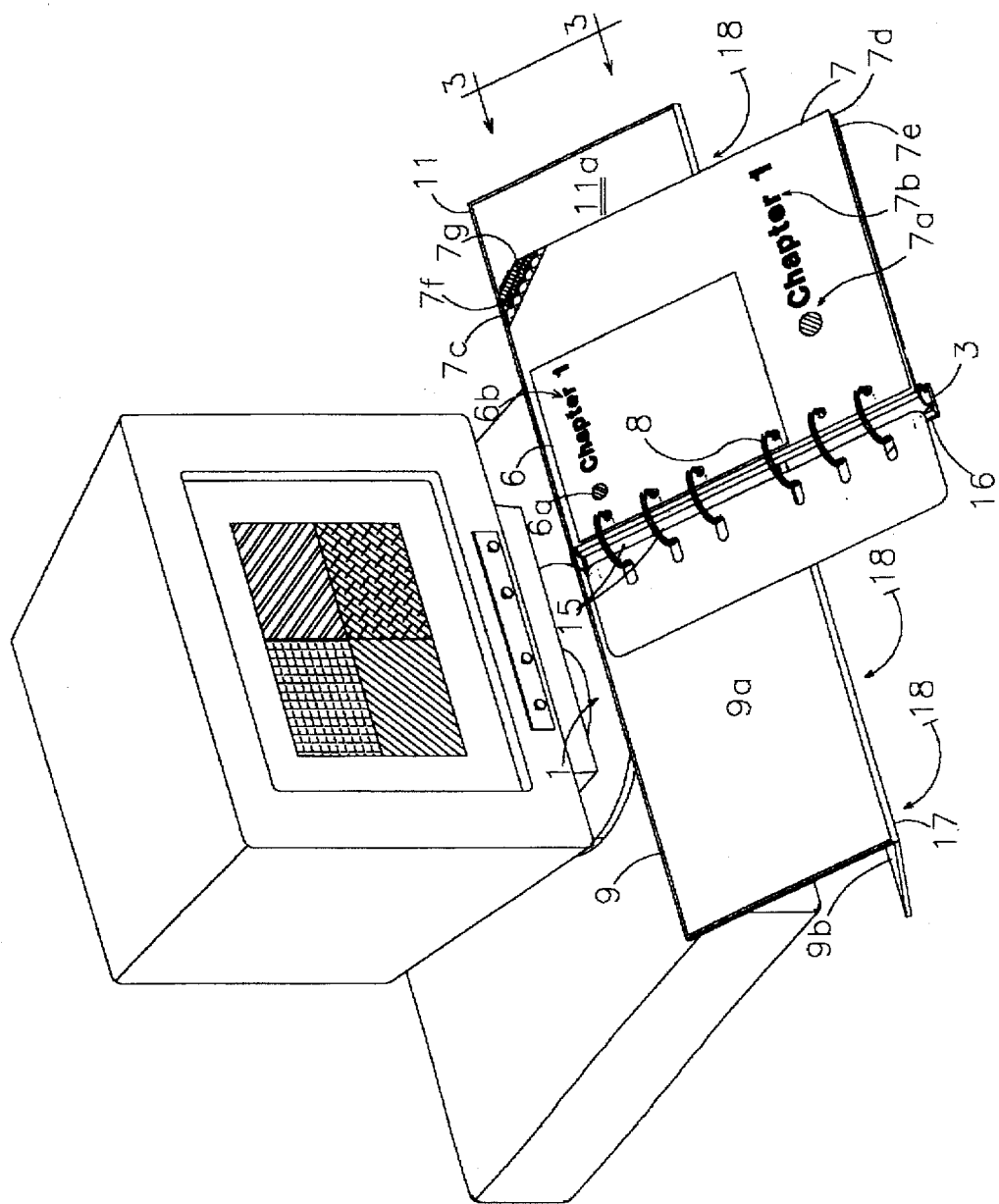
FIG. 2 shows a perspective view of a binder in accordance with one embodiment of the present invention, in the open, upright configuration.

Referring to both FIGS. 1 and 2 (FIG. 2 using numbering corresponding to that in FIG. 1), the front and rear portions of the cover each have a flex line 17 so as to define respective upper and lower portions of the front and rear portions (designated 9a, 9b, 11a and 11b, respectively), and so as to allow the lower portions of the front and rear portions (i.e. 9b an 11b) to be moveable between a position relatively near the spine member to a position relatively further from the spine member (along direction arrows 18), so as to allow the binder to be configured to stand at an angle on the surface.

Figure 6:
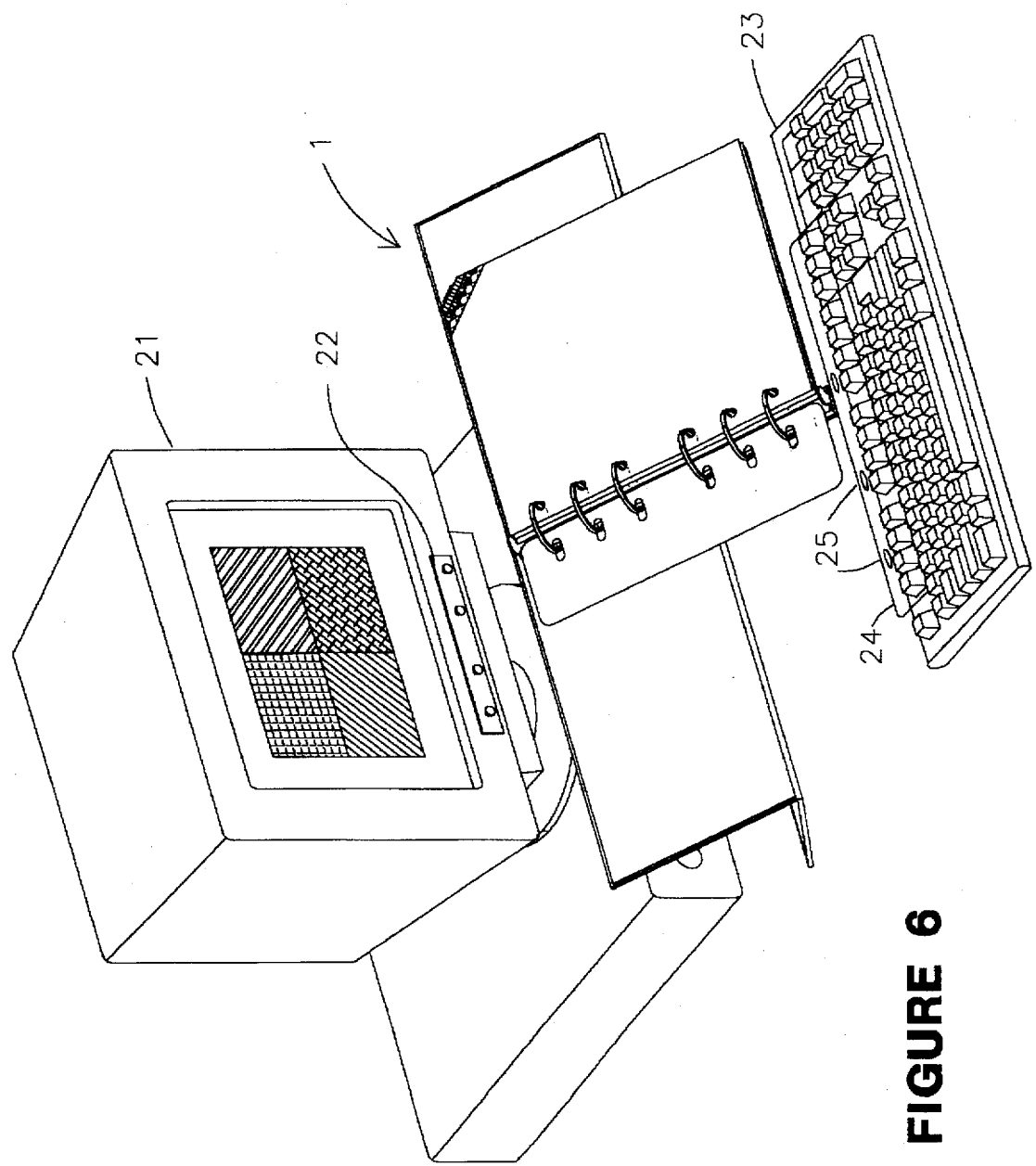
FIG. 6 shows an elevational view of a binder in accordance with one embodiment of the present invention, placed between a computer monitor and a computer keyboard also in accordance with one embodiment of the present invention.

FIGS. 1 and 2 also show that binder 1 may contain one or more smaller pages 6 and one or more larger pages 7. The smaller pages such as 6 may be in the form of a booklet or a single-page quick-help guide. Larger pages such as 7 may also be in the form of pages larger than can be fully enclosed on one side of the binder and may be in the form of large-fold out pages. As can also be appreciated from FIGS. 1 and 2, pages such as 6 and 7 may contain indicia such as words or colors to associate the written portions of the instructional materials with the screen displays produced by the microprocessor instructions (as is shown in FIG. 6). For instance, small page 6 may be provided with a color dot 6a or indicia 6b so as to associate it with the contents of large page 7 which may bear corresponding color slot 7a and indicia 7b. Also, as a supplement or in the alternative, pages such as 7, 7e and 7d may be cropped and provided, respectively, with colored portions 7c, 7f and 7g.

Figure 3:
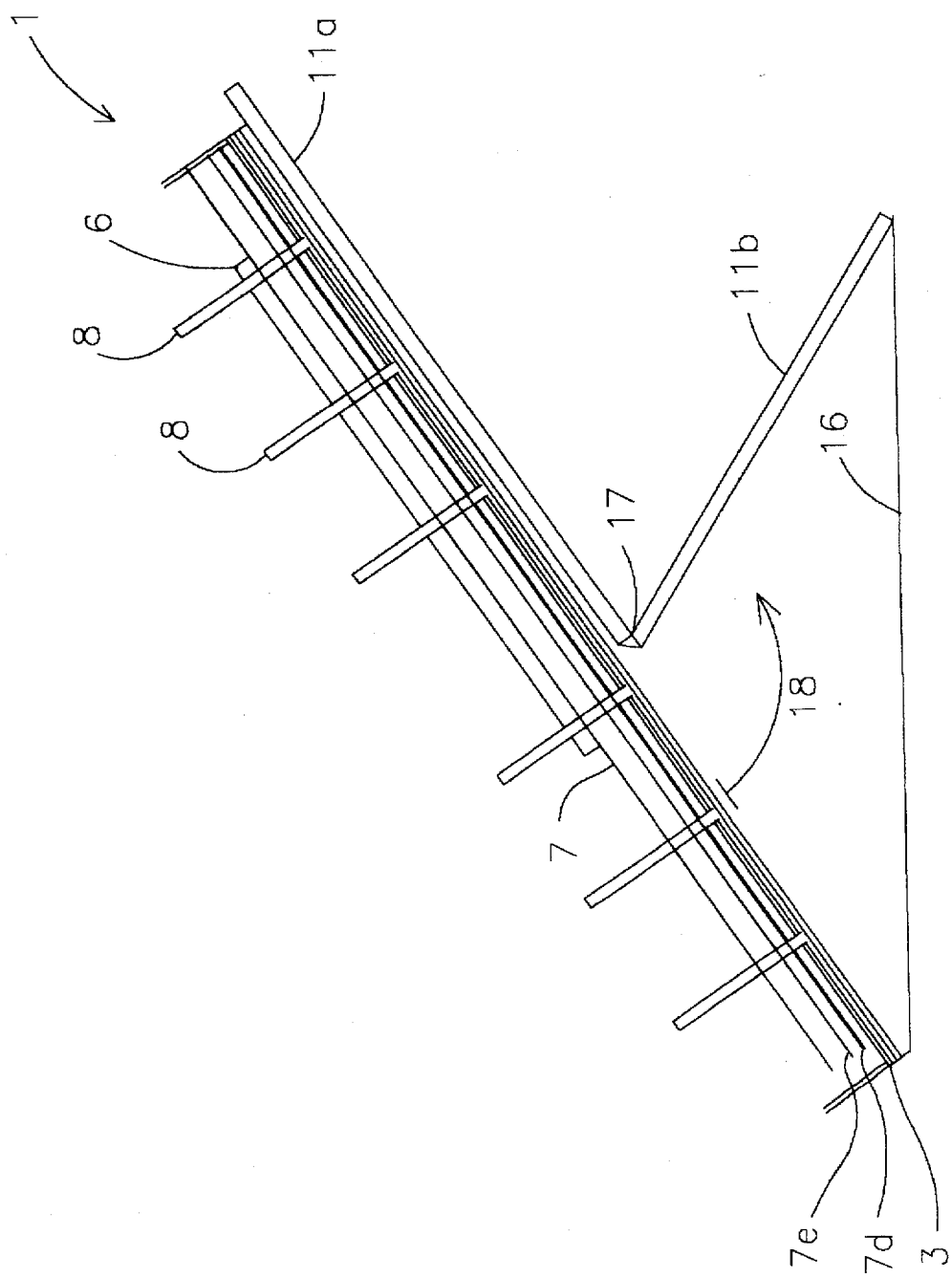
FIG. 3 shows a side elevational view of a binder in accordance with one embodiment of the present invention, in the open, upright configuration.

FIG. 3 shows a side elevational view of a binder in accordance with one embodiment of the present invention, taken along line 3—3 of FIG. 2. FIG. 3 is provided with numbering corresponding to that of FIGS. 1 and 2. FIG. 3 shows binder 1 having spine 3 supporting attachment rings 8 which hold in place small page 6 and larger pages 7, 7d and 7e. FIG. 3 shows that bottom portions 9b (not shown) and 11b have been swung along direction line 18 and about flex line 17, such that they are flexed with respect to upper portions 9a (not shown) and 11a. The degree of ravel of bottom portions 9b and 11b are limited by the length of retention strap 16 which may be attached at one end to spine member 3 and at the other end to the bottom portion of the cover (i.e., portions 9b and/or 11b). Such an arrangement allows binder 1 to be held upright at an angle to the surface on which it is placed.

The flex line 17 of the cover may be rendered flexible through the use of any appropriate means such as a hinge holding the upper portions 9a and 11a to their respective bottom portions 9b and 11b, where the upper and lower portions are separate pieces. This may also be accomplished by the interpositioning of a flexible material such as flexible rubber or plastic to serve a hinge-like function. In the preferred embodiment, the cover is constructed on an upper piece corresponding to upper portions 9a and 11a (together with central portion to which the spine is attached), and a lower piece corresponding to lower portions 9b and 11b (together with the central portion between the two that resides behind the spine member when the binder is in the flat or closed configuration). These two pieces are held together by a covering material which is adhered to and wrapped within the upper and lower pieces while leaving a small, flexible gap therebetween. In this manner, the upper and lower pieces are, along the flex line 17, held together only by the covering material which is sufficiently flexible to allow the bottom portions 9b and 11b to be flexed along direction line 18. The retaining member such as strap member 16 may be of any appropriately flexible material to allow it to be folded up between the spine and the lower portion of the binder cover when in the flat or closed configurations. This member may be of any material such as vinyl, leather, flexible metal, etc. The length of the retaining member may be adjusted to any length so as to control the angle at which the binder is held when in its upright configuration. A shorter retaining member will cause the binder to stand more upright, while a longer retaining member will allow the binder to lay at a more acute angle to the surface on which it rests. This angle preferably is adjusted such that the top of the binder is at a height approximately that of the bottom of the computer screen with which the written materials are used. Preferably, the binder in its upright configuration is placed between the computer monitor and the keyboard to allow the user convenient reference to the written materials, while operating the computer.

Figure 4:
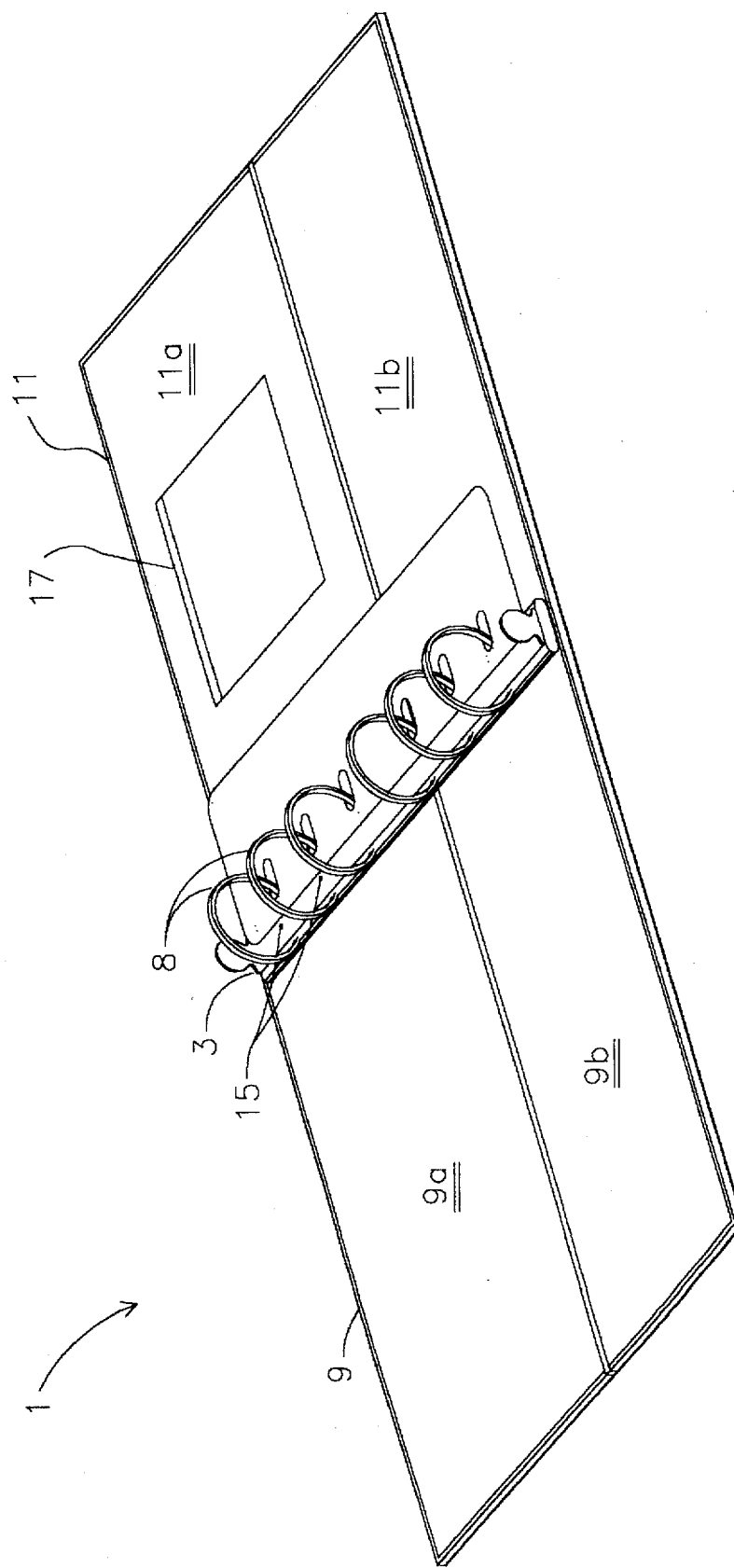
FIG. 4 shows a perspective view of a binder in accordance with one embodiment of the present invention.

FIG. 4 shows a perspective view of a binder in accordance with one embodiment of the present invention as is shown in FIG. 1 with the exception that the binder contents are not shown. FIG. 4 is provided with numbering corresponding to that of FIGS. 1 and 2. FIG. 4 also shows internal pocket 17 which may be used to hold a computer disk which may be used to contain data in electronic form or computer programs to which the instructional materials pertain.

Figure 5:
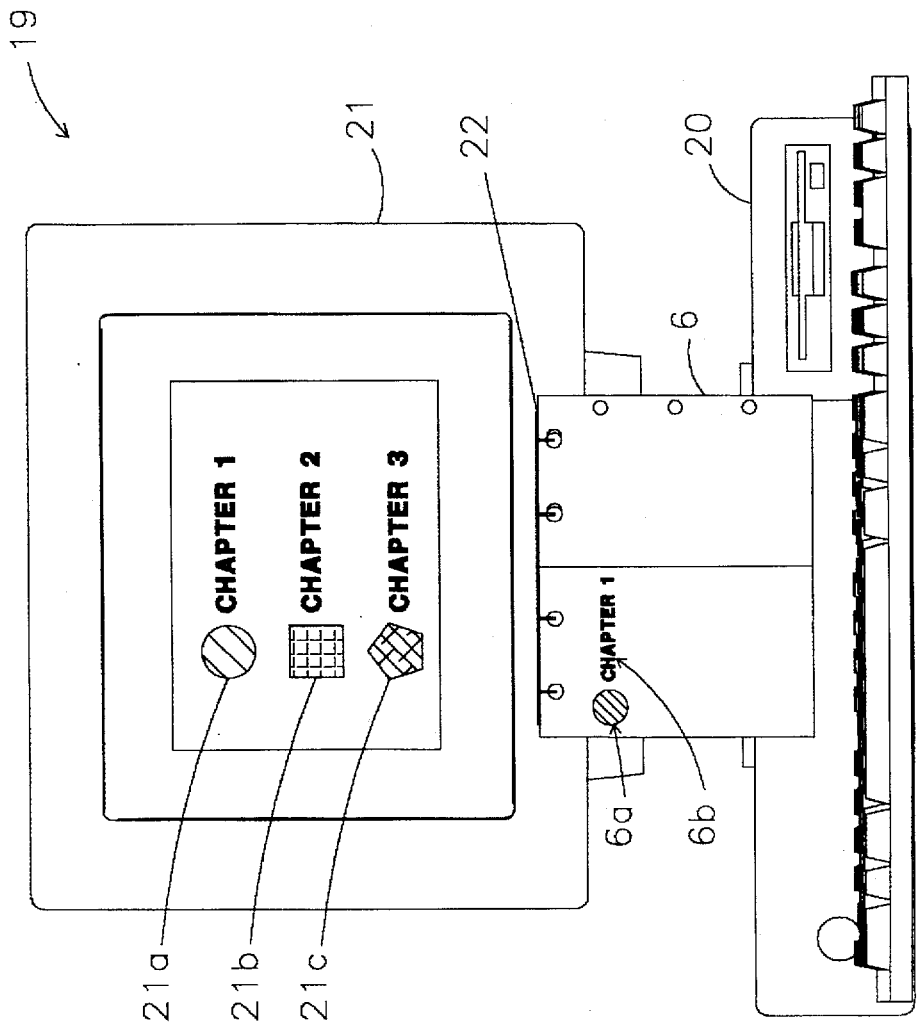
FIG. 5 shows an elevational view of a computer monitor showing a pager hanger in accordance with one embodiment of the present invention.

FIG. 5 shows an elevational view of a computer provided with a page hanger in accordance with one embodiment of the present invention. FIG. 5 shows computer 19 comprising microprocessor unit 20 and computer monitor 21. Microprocessor unit 20 provides microprocessor instructions to produce a screen display such as indicia of 21a, 21b and 21c, for example. FIG. 5 also shows a page hanger 22 which may be attached, preferably removably attached, to the computer near enough to the monitor screen to allow convenient reference between the computer monitor and a small page print (or booklet) such as small page 6. Small page 6 is provided with indicia 6a or 6b which may correspond to the indicia or colors of the screen display (i.e., indicia 21a). The page hanger 22 may be removably attached such as through a releasable adhesive or through any equivalent means. This apparatus allows small page 6 to be remove from binder 1 for convenient placement near the screen display of computer monitor 21.

FIG. 6 shows an elevational view of a binder in accordance with one embodiment of the present invention, shown in the upright configuration, and between a computer monitor and a computer keyboard. FIG. 6 shows a computer monitor 21 provided with numbers corresponding to that of FIG. 5. FIG. 6 also shows binder 1 in an upright configuration and computer keyboard 23. Binder 1 is in an upright configuration and is adapted to stand so as to be at an angle such that the top of the binder does not obscure the monitor screen. FIG. 6 also shows page hanger 22, here shown without a small page hung thereupon.

Another optional feature of the system of the present invention shown in FIG. 6 is the use of a template 24 which may be made to have indicia 25, color, etc., corresponding to that of the screen display and/or the binder contents.

Figure 7:
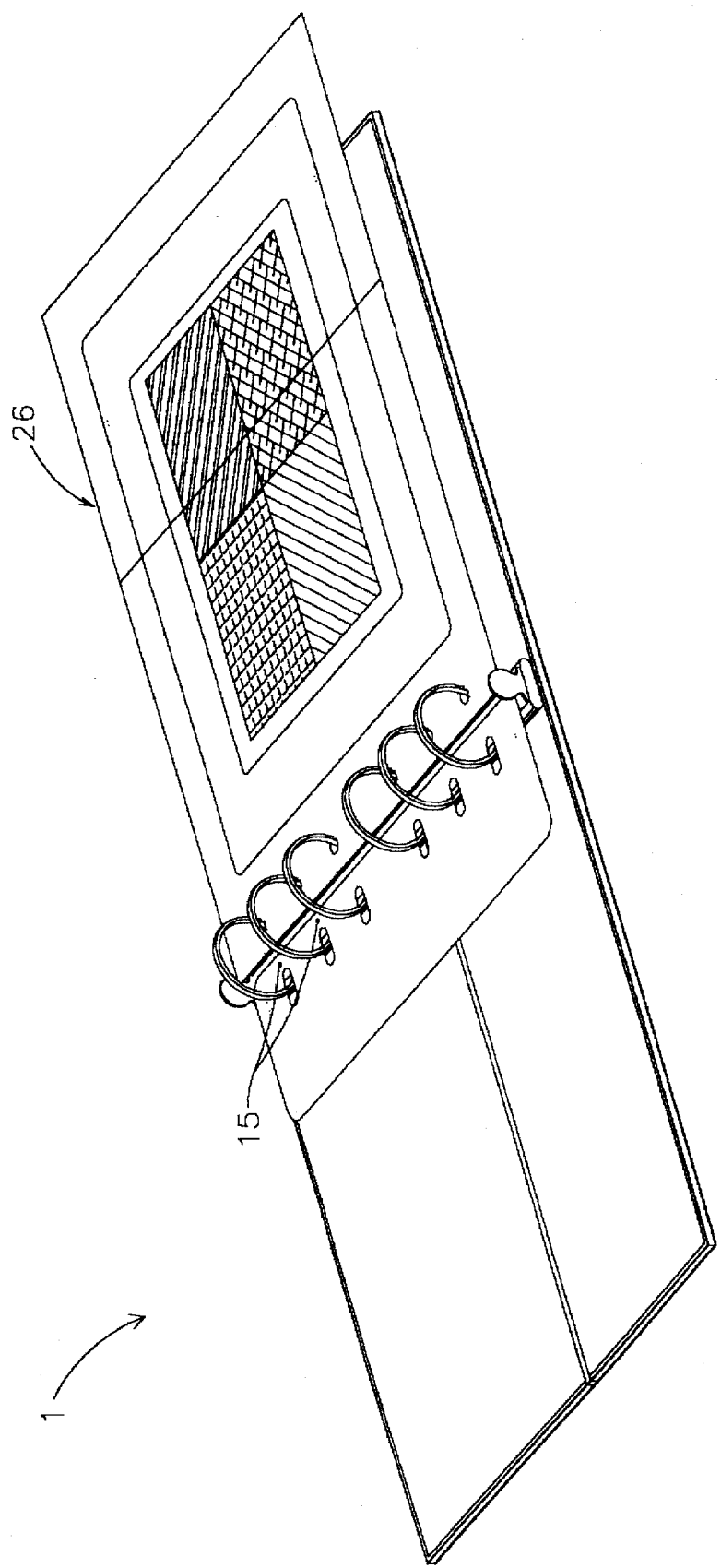
FIG. 7 is a perspective view of a binder in accordance with one embodiment of the present invention, in the open, flat configuration.

FIG. 7 shows binder 1 having larger pages, such as page 26 which is adapted to fold out so as to extend beyond the dimensional limit of the binder. Page 26 is shown with a depiction of a screen display.

In view of the foregoing disclosure, it will be obvious to one of ordinary skill in the art to make modifications, alterations and substitutions in and to the present invention, such as to the substitution, integration or disintegration of parts, without departing from the spirit of the invention reflected in the appended claims.

What is claimed is:

1. A computer instruction apparatus for instructing an operator, said apparatus comprising:
   (a) a computer having a microprocessor, a monitor having a monitor screen, and a human operation interface, said monitor placed on a surface such said monitor screen is visible to said operator;
   (b) an instructional loose-leaf binder adapted to be configured to stand at an angle on said surface so as to be simultaneously visible to said operator with said monitor screen, said binder comprising:
      (i) a spine member adapted to be attached to pages;
      (ii) a binder cover having front and rear portions, and moveable between a closed position to an open position, said binder cover attached to said spine member, and said front and rear portions each having a flex line so as to define respective upper and lower portions, of said from and rear portions and so as to allow said lower portions of said front and rear portions to be moveable between a position relatively near said spine member to a position relatively further from said spine member, so as to allow said binder to be configured to stand at an angle on said surface; and
      (iii) a page hanger attached to said monitor, said pages adapted to be attached to said spine member and said page hanger.

2. A computer instruction apparatus according to claim 1 additionally comprising a retainer member attached to said binder, and adapted to control the distance said lower portions of said front and rear portions may be moved when moved to said position relatively further from said spine member.

3. A computer instruction apparatus according to claim 2 wherein said retainer member is a strap attached between said spine member and said lower portion of said binder cover.

4. A computer instruction apparatus according to claim 1 wherein said binder contains pages of at least two types, said page types respectively bearing two types of indicia, and wherein said microprocessor is adapted to create displays on said monitor screen of at least two types, said display types respectively being two types of indicia, and respectively corresponding to said pages types.

5. A computer instruction apparatus according to claim 1 wherein said binder contains pages of at least two types, said page types respectively bearing two colors, and wherein said microprocessor is adapted to create displays on said monitor screen of at least two types, said display types respectively containing two colors, and respectively corresponding to said pages types.

6. A computer instruction apparatus according to claim 1 wherein said page hanger is adapted to be removable from said monitor and attached in said binder.

7. A computer instruction apparatus placed on a surface, said apparatus comprising:
   (a) a computer having a microprocessor, a monitor screen positioned above said surface and a human operation interface positioned on said surface;
   (b) an instructional binder adapted to be configured to stand at an angle on said surface, said binder comprising:
      (i) a spine member adapted to be attached to pages;
      (ii) a binder cover having front and rear portions, and moveable between a closed position to an open position, said binder cover attached to said spine member, and said front and rear portions each having a flex line so as to define respective upper and lower portions of said front and rear portions and so as to allow said lower portions of said front and rear portions to be moveable between a position relatively near said spine member to a position relatively further from said spine member, so as to allow said binder to be configured to stand at an angle on said surface;
   said instructional binder positioned on said surface between said monitor screen and said human operation interface, and said angle being such that said upper portions of said front and rear portions are disposed below said monitor screen.

8. A computer instruction apparatus according to claim 7 additionally comprising a retainer member attached to said binder, and adapted to control the distance said lower portions of said front and rear portions may be moved when moved to said position relatively further from said spine member.

9. A computer instruction apparatus according to claim 8 wherein said retainer member is a strap attached between said spine member and said lower portion of said binder cover.

10. A computer instruction apparatus according to claim 7 wherein said binder contains pages of at least two types, said page types respectively bearing two types of indicia, and wherein said microprocessor is adapted to create displays on said monitor screen of at least two types, said display types respectively bearing two types of indicia, and respectively corresponding to said pages types.

11. A computer instruction apparatus according to claim 7 wherein said binder contains pages of at least two types, said page types respectively bearing two colors, and wherein said microprocessor is adapted to create displays on said monitor screen of at least two types, said display types respectively containing two colors, and respectively corresponding to said pages types.

12. A computer instruction apparatus according to claim 7 wherein said binder contains pages, and wherein said apparatus comprises a page hanger attached to said monitor, said pages adapted to be attached to said spine member and said page hanger.

13. A computer instruction apparatus according to claim 12 wherein said page hanger is adapted to be removable from said monitor screen and attached in said binder.

14. A computer instruction apparatus according to claim 7 wherein said binder contains pages of at least two sizes, a smaller size, and a larger size, and wherein said apparatus comprises a page hanger attached to said monitor, said pages of said smaller size adapted to be attached to said spine member and said page hanger.

15. A computer instruction apparatus according to claim 14 wherein said binder contains pages of larger size are each creased so as to be folded between a collapsed position and an extended position.

16. A computer instruction apparatus for instructing an operator, said apparatus comprising:

(a) a computer having a microprocessor, a monitor having a monitor screen and a human operation interface, said monitor placed on a surface such said monitor screen is visible to said operator;

(b) an instructional loose-leaf binder adapted to be configured to stand at an angle on said surface so as to be simultaneously visible to said operator with said monitor screen, said binder comprising:

(i) a spine member adapted to be attached to pages;

(ii) a binder cover having front and rear portions, and moveable between a closed position to an open position, said binder cover attached to said spine member, and said front and rear portions each having a flex line so as to define respective upper and lower portions of said front and rear portions and so as to allow said lower portions of said front and rear portions to be moveable between a position relatively near said spine member to a position further from said spine member, so as to allow slid binder to be configured to stand at an angle on said surface, wherein said binder contains pages of at least two sizes, a smaller size and a larger size, and wherein said apparatus comprises a page hanger attached to said monitor, said pages of said smaller size adapted to be attached to said spine member and said page hanger.

17. A computer instruction apparatus according to claim 16 wherein said pages of said larger size are each creased so as to be folded between a collapsed position and an extended position.

* * * * *